United States Patent [19]
Kataoka et al.

[11] Patent Number: 5,530,684
[45] Date of Patent: Jun. 25, 1996

[54] ELECTRONIC DEVICE WITH CALENDAR FUNCTION

[75] Inventors: Yoshiro Kataoka, Sakurai; Shigenobu Yanagiuchi, Tenri; Yasuharu Tanaka, Nara-ken; Yoshihiro Shintaku, Nara; Kiyoshi Matsuo, Nara-ken; Yasuo Wada, Yamatokooriyama, all of Japan

[73] Assignee: Sharp Kabushiki Kaisha, Japan

[21] Appl. No.: 845,803

[22] Filed: Mar. 9, 1992

Related U.S. Application Data

[63] Continuation of Ser. No. 360,997, Jun. 2, 1989, abandoned.

[30] Foreign Application Priority Data

Jun. 3, 1988 [JP] Japan .................................. 63-138089
Jun. 3, 1988 [JP] Japan .................................. 63-138090

[51] Int. Cl.$^6$ .................................................... G04B 19/24
[52] U.S. Cl. ................................................. 368/41; 368/28
[58] Field of Search ............................... 368/41, 28–30, 368/108, 10; 364/521, 527, 518

[56] References Cited

U.S. PATENT DOCUMENTS

| | | |
|---|---|---|
| 96,792 | 11/1869 | Gale . |
| 3,717,299 | 2/1973 | Penn . |
| 4,005,571 | 2/1977 | Wolff ........................................ 368/108 |
| 4,019,027 | 4/1977 | Kelley ........................................ 368/41 |
| 4,086,136 | 4/1978 | Isowa et al. . |
| 4,116,768 | 9/1978 | Isowa et al. . |
| 4,212,946 | 7/1980 | Nonaka et al. . |
| 4,284,721 | 3/1981 | Oyama et al. . |
| 4,339,534 | 7/1982 | Johansen et al. . |
| 4,361,874 | 11/1982 | Yasuda ........................................ 368/28 |
| 4,415,271 | 1/1983 | Levine ........................................ 368/41 |
| 4,460,965 | 7/1984 | Trehn et al. . |
| 4,521,514 | 6/1985 | Oyama et al. . |
| 4,881,147 | 11/1989 | Vincent ........................................ 368/41 |
| 4,935,355 | 6/1990 | Ulmer et al. . |
| 5,002,872 | 3/1991 | Gross . |
| 5,023,851 | 6/1991 | Murray et al. ........................................ 368/41 |
| 5,113,380 | 5/1992 | Levine ........................................ 368/41 |

FOREIGN PATENT DOCUMENTS 2613296  2/1976  Germany .
58572    4/1984  Japan .

OTHER PUBLICATIONS

"Microprocessors and Microcomputors" Soucek, John Wiley and Sons, 1976 pp. 223–224.

Primary Examiner—Bernard Roskoski

[57] ABSTRACT

An electronic device is provided with a calendar function such that it is possible to display one or more schedules. The electronic device includes an input device which receives data representing starting and ending times. This data is displayed in graphic format to illustrate the starting and ending times of the schedule.

5 Claims, 16 Drawing Sheets

*Fig.3(a)*

×　CALC　×
— M —
−1234567890.

MON JAN 11, 1988 — e
@ 7:30AM ~ 9:00PM — g
BREAKFAST MEETIG — f
AT SHERATON
WITH ABC CONSULT — h
ING

*Fig.4(b)*

MON JAN 11, 1988
BREAKFAST MEETIG
AT SHERATON
WITH ABC CONSULT
ING

Fig.5(a)

```
 x x   JAN  1988    x x
11 M : BREAKFAST  ME
12 T : LV . FOR  LONDO
13 W : LONDON
14 T : LONDON
15 F : BACK  TO  USA
16 S : NANCY  B' DAY
17 S :
```

Fig.5(b)

```
x MON JAN 11, 1988
PLAN: · 9 · 11 · 1 · 3 · 5 ·
  BREA
  STAF    ⊢─┐
  SEE         ⊢──┐
  INTE              ⊢─┐
  PROD                 ───
  DINN                      >
```

Fig.5(c)

```
x MON JAN 11 , 1988
PLAN: · 9 · 11 · 1 · 3 · 5 ·
  BREA
  STAF    ───
  SEE         ───
  INTE              ───
  PROD                 ────
  DINN                      >
```

Fig. 6 (a)

```
x x x  JAN 1988  x x x
 S   M   T   W   T   F   S
                     1   2
 3   4   5   6   7   8   9
10  11  12  13  14  15  ▮16▮
17  18  19  20  21  22  23
24  25  26  27  28  29  30
31         [11/355]       ▮2▮
            a    b       c
```
d

Fig. 6 (b)

```
x x x  JAN 1988  x x x
 M   T   W   T   F   S   S
                 1   2   3
 4   5   6   7   8   9  10
11  12  13  14  15  ▮16▮ 17
18  19  20  21  22  23  24
25  26  27  28  29  30  31
           [11/355]      ▮2▮
```

ELECTRONIC DEVICE WITH CALENDAR FUNCTION

This application is a continuation of application Ser. No. 07/360,997 filed on Jun. 2, 1989, now abandoned.

BACKGROUND OF THE INVENTION

1. Field of the Invention

The present invention relates to an electronic device which is provided with a calendar display.

2. Description of the Prior Art

Handy type electronic organizers or electronic memorandum pad having a schedule control function are provided with a calendar display unit so that an operator can enter information relating to a date in the schedule into the electronic device and note the date by reading the calendar display unit.

In such a calendar function, day and month for one month are displayed on the calendar display unit based on the day and month information counted by a clock circuit in the electronic memorandum pad. One example of the calendar display is shown in FIG. 6(a). The operator can know which day of the week the day on the schedule is and that the day on the schedule is a holiday or a normal working day by looking at the calendar display unit.

In the conventional electronic memorandum pads with the calendar display, only one month calendar can be displayed. Therefore, it is impossible to know that the day designated by the operator (the day designated by a cursor or the like of the electronic note) corresponds to how many days from the beginning of that year or how many days are there until the designated day or how many weeks are there until the week to which the designated day belongs from the beginning of the year. In order to know the information mentioned above, it is necessary to count the days or week by the operator displaying the calendar of every month on the display unit. Such a operation is troublesome.

SUMMARY OF THE INVENTION

An essential object of the present invention is to provide an electronic organizer in which it is easily to know how long it is from the first day of the year to a specific date which is the date entered in the device, how long it is until the specific date and how many weeks it is from the first week of the year until the specific date.

According to the present invention, there are provided an electronic device having display means for displaying a calendar showing at least which day of the week of a specified day and month comprising:

display means for displaying any of or all of a first number of day showing how many days will pass or passed from the first day of the year to the specified day, a second number of days showing how many days are left from the specified day to the last day of the year, and/or a number of weeks showing how many weeks will pass or passed from the first week of the year to the week in which the specified day is contained, and an operation unit for indicating to display which of the first number of days, the second number of days and the number of weeks.

There is further provided a schedule control device for storing contents of one or more schedules with first data consisting of start times and second data consisting of end times of the schedules and for displaying the stored data, the control device comprising:

display means for displaying the schedule in a form of a graph showing the start data and end data of the respective stored schedules with marks showing the start time and the end time.

BRIEF DESCRIPTION OF THE DRAWINGS

FIGS. 3(a) and 3(b) are diagrams showing an example of an indication in a calculation mode, FIGS. 4(a) and 4(b) are diagrams each showing an indication of a schedule, FIGS. 5(a), 5(b) and 5(c) are diagrams each showing another example of an indication of a schedule, FIGS. 6(a) and 6(b) are diagrams each showing an example of a calendar indication in a calendar mode.

DETAILED DESCRIPTION OF THE PREFERRED EMBODIMENT

An electronic memorandum pad according to the present invention is also available for an electronic apparatus such as an electronic desk computer and comprises various functions such as a calendar indication function, a schedule input/output function, a world clock function and a computer function performing at least four calculations.

Figure 1A:
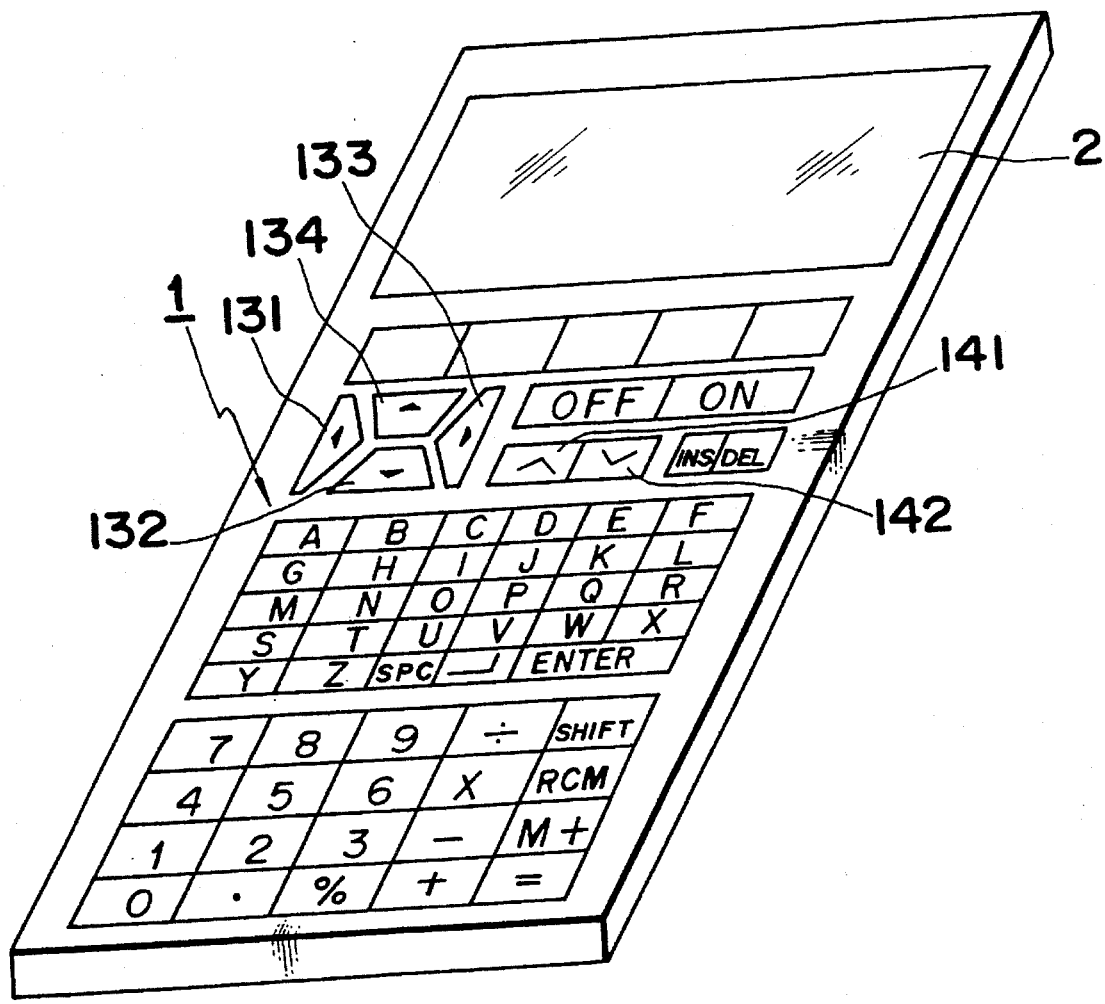
FIGS. 1(a) and 1(b) are respectively schematic perspective and plan views showing a number of electronic memorandum pads having a number of functions including such as a function for commanding schedules according to the present invention.
Figure 1B:
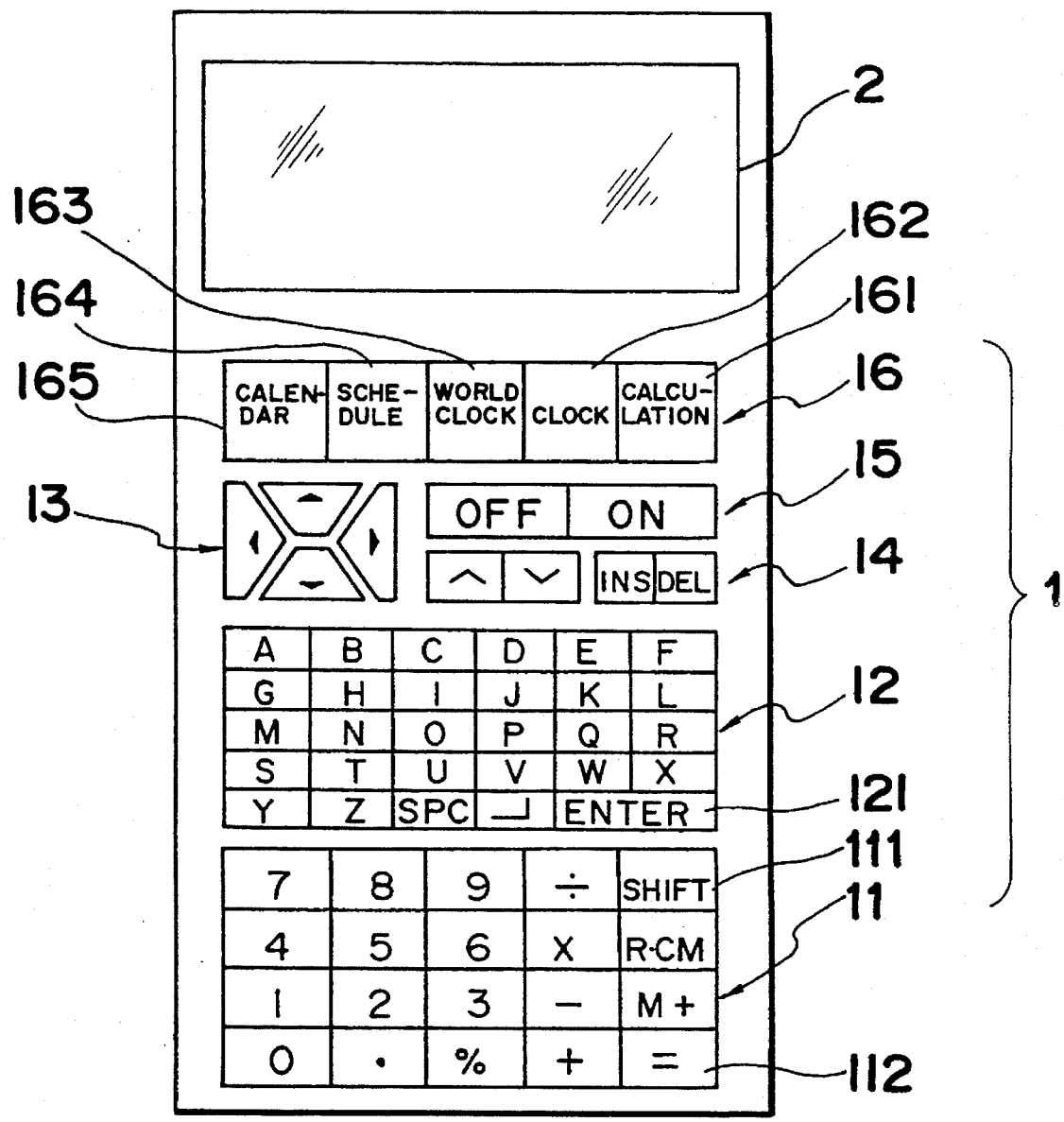

As shown in FIGS. 1(a) and 1(b), the electronic memorandum pad comprises an operating portion 1 and a display unit 2. In the operating portion 1, there are provided various kinds of key groups such as a calculation input keys group 11 comprised of numeral input key and calculation designating keys for performing a calculation, a character input key group 12, a cursor shift key group 13 for designating a position such as a character input position and a date input position, an editing key group 14 for controlling characters such as character insertion or deletion, a power switching key group 15 for switching on or off a power source of an electronic memorandum pad body, and further comprises a mode or function selecting key group 16 for selecting each mode of calendar function mode schedule function mode, world clock function mode, time indication function mode, and computer function.

Moreover, the display unit 2, for example, can be a LCD (liquid crystal display) of a dot matrix shape. In the display unit 2, there can be displayed a lot of lines or columns of characters, numerals and various marks in a dot matrix shape of such as 5×7 characters.

Figure 2:
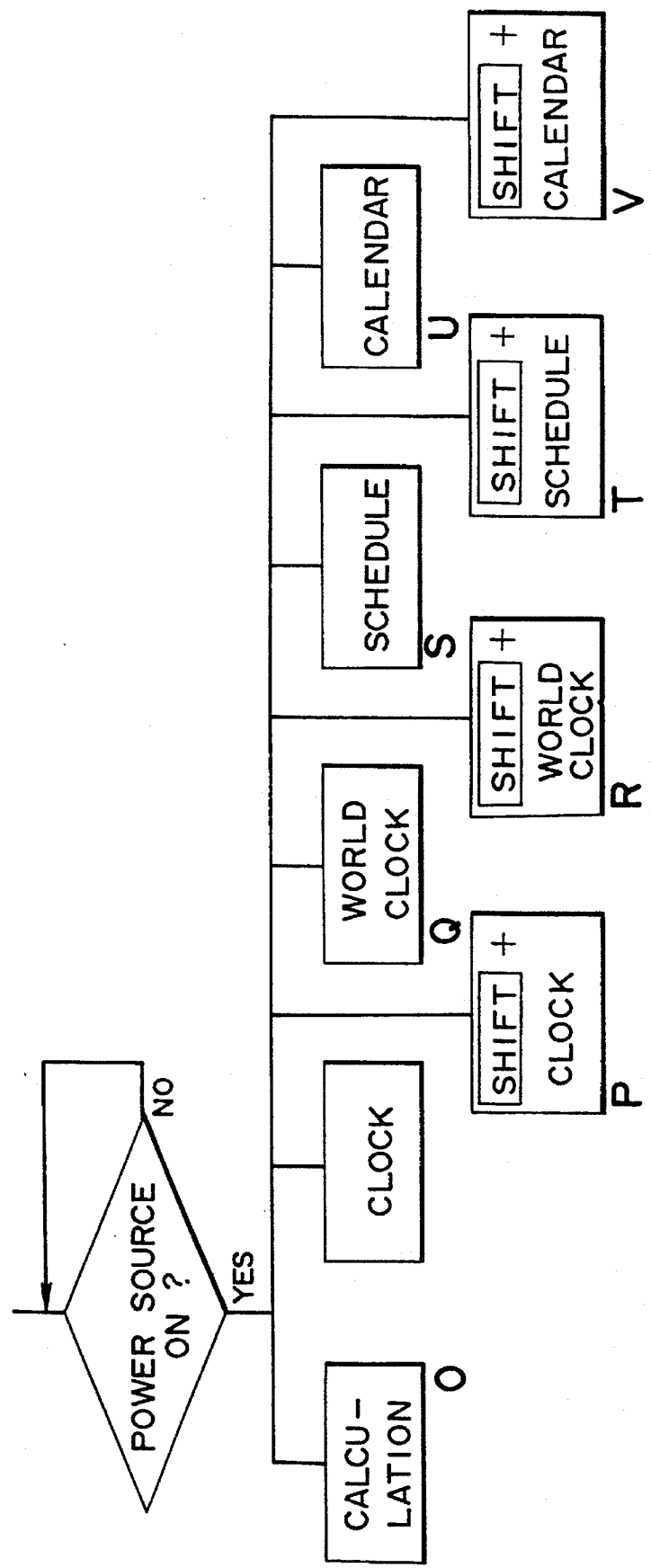
FIG. 2 is a flow chart showing a mode selection for selecting various kinds of functions according to the present inventions.

In the electronic memorandum pad, upon operating one of the mode selecting keys 16, a mode corresponding to the operated key is selected. For example, as shown in FIG. 2, when the power on key 15 is switched on, the state of the operation process of the memorandum pad becomes selectable one of the above mentioned various modes. At this time it may be so constituted that the computer function mode is selected with priority by switching on the power on key 15.

Upon operating a calculation function mode selecting key 161 which is one of the mode selecting keys 16, calculation function mode is selected. The calculated results and equations are indicated in a manner as shown in FIG. 3(a) or 3(b).

Figure 7A:
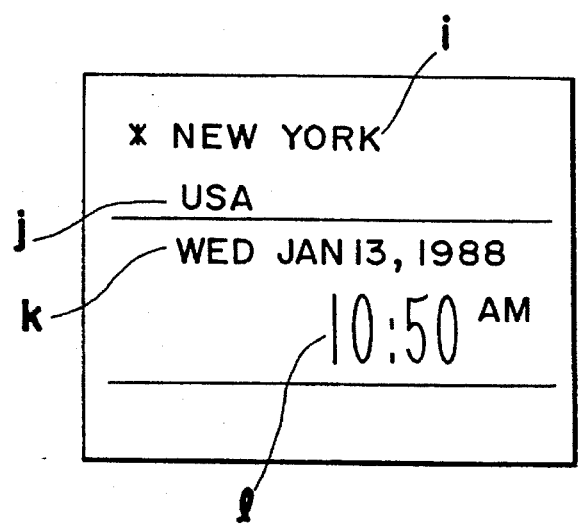
FIGS. 7(a) and 7(b) are diagrams respectively showing an indication of an electronic clock in a home region and an indication of an electronic world clock.

Upon operating a clock mode selecting key 162 which is one of the mode selecting keys 16, a time counted by a clock circuit unit is indicated as shown in FIG. 7(a), for example. Subsequently, upon operating the same clock mode selecting key 162 while depressing or after operating a SHIFT key 111 of the calculation input keys 11, there is selected a mode for changing the time region counted by the clock circuit unit.

Figure 7B:
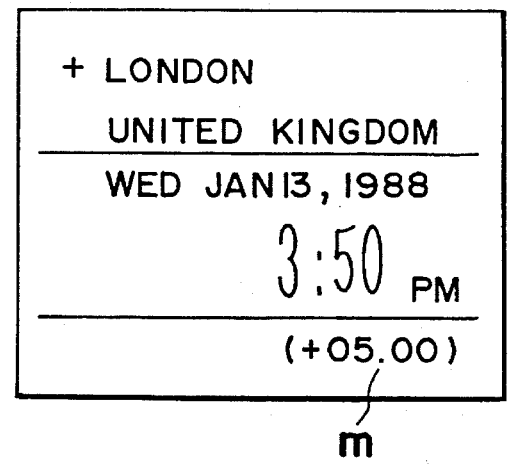

Upon operating a world clock mode selecting key 163 which is one of the mode selecting keys 16, times for various regions in the world can be indicated as shown in FIG. 7(b) for example. When correcting the time, upon operating the world clock key 163 once more while depressing or after operating the SHIFT key 111, the time correcting mode is set.

Moreover, upon operating a schedule mode selecting key 164, the input/output operation of the schedule can be performed and the memorandum pad is available as a schedule management device, which are indicated as shown in FIGS. 4 and 5. Subsequently, upon operating the schedule key 164 once more while depressing or after operating the SHIFT key 111, the input/output of a second schedule different from the first schedule becomes operable.

In addition, upon operating a calendar mode selecting key 165, a calendar for one month is indicated as shown in FIG. 6(a). The indication of the calendar is general one in which Sundays are arranged in first days of the respective weeks. On the contrary, when indicating a calendar as shown in FIG. 6(b), upon operating the calendar key 165 while depressing or after operating the SHIFT key 111, there can be indicated another type of calendar in which Mondays are arranged as the first days of the respective weeks.

The above is the gist of the various kinds of functions provided in an electronic memorandum pad and the respective functions thereof are described as follows.

CALCULATION FUNCTION MODE

In the calculation function mode which is set by operating the calculation key 161 of the mode selecting keys 16 as described above, upon operating various kinds of keys of the numeral keys and calculation input keys 11, the numeral values to be entered are indicated in turn and the calculated value is indicated as shown in FIG. 3(a). This indication is similar to the one-column indication in the prior art.

Upon consecutively operating the calculation key 161, the calculation process in doing sums on paper is indicated together with the indication of numeral values and operation symbols. One example of the indications thereof is shown in FIG. 3(b).

As described above, in the calculation mode, it is selected whether the one-column indication or multi-column indication is performed depending on the selection of either one time operation or consecutive operation of the calculation key 161. Instead of selecting the indication in the calculation function mode by changing the time of the operation of the calculation key 161, it may be selected whether the one-column indication or multi-column indication is performed by operating another key in the calculation function mode.

CALENDAR FUNCTION MODE

Referring to the calendar function mode, upon operating the calendar key 165 of the mode selecting keys 16, an indication of a calendar such as a calendar of January in 1988 is performed in the display unit 2 as shown in FIG. 6(a). In this indication of the calendar, although Sundays are arranged on the first days in the weeks, it is not limited to this and may be displayed or arranged in different manners in various countries, and Mondays, for example, may be arranged as the first days in the respective weeks as to be described later. Moreover, in the indication of the calendar shown in FIG. 6(a), the eleventh day represents the cursor position where more attention is attracted to the day than to any other days. The cursor position can be freely shifted up and down or right and left by operating the cursor shift keys 13.

An indication portion "a" indicated by a character "a" mark represents the number of the days from January 1 in that year to the day designated by the cursor. An indication portion "b" indicated by a character "b" mark represents the number of remaining days from the corresponding day designated by the cursor to the last day, i.e., December 31 of that year. An indication portion "c" indicated by a character "c" mark represents in what week of the year the day designated by the cursor is. In other words, the above indication portions "a", "b" and "c" represent that, January 11 corresponding to the cursor position is the eleventh day from the first day in the year and that there are 355 days left after January 11 on the year until December 31 and that the day is in the second week of the year. The above indication portion c is indicated in inversion.

According to the indication as described above, it is quite obvious how many days are left after today and how many days are passed from January 1 to today. Moreover, with reference to the number of the days indicated in the portion "a", the number of the days present in a period from any day to a specific day can be easily calculated. In other words, assuming that the number of the days indicated in the portion "a" is A on a day and that the number of the days indicated in the portion "a" on a specific day is B, the number of the days present between the two days mentioned above can be easily calculated by a calculation B-A (in this case A<B). When the two days cover two years, the number of the days between a day in the previous year and a specific day in the present year can be easily obtained by adding the number of the days in the indication portion "a" in the present year to the number of the days in the indication portion "b" in the previous year. The inverted indication in the indication portion "d" represents the day according to the second schedule.

SCHEDULE FUNCTION MODE

The schedule mode is set by operating the schedule key 164 as described above. If a schedule is being stored at this time, the contents of the schedule are indicated with the beginning and ending times of the schedule as shown in FIG. 4(*a*). If there is no schedule input, the indication is performed without any time and content of a schedule. In order to input a schedule in such an indication display with no schedule input, upon inputting the date and time and the contents of the schedule, they are stored in a memory unit in the memorandum device. FIG. 4(*b*) shows a schedule indication without the time of the input schedule. In FIG. 4(*a*), an indication portion "e" represents the date, an indication portion "f" represents the beginning time and ending time of the schedule and an indication portion "g" represents the presence or absence of an alarm and if an alarm is needed, a bell mark is indicated at the portion "g". An indication portion h represents the contents of the schedule.

Differently from the schedule function mode as described above, upon operating the calendar key 165, the calendar indication is changed into a schedule indication as shown in FIGS. 5(*a*) and 5(*b*). For example, if the calendar key 165 is operated under the indication shown in FIG. 6(*a*), the contents of the schedule for a week after the eleventh day which is designated by the cursor are indicated as shown in FIG. 5(*a*). In FIG. 5(*a*), the days of the month and the days of the week (capital letters) and the contents of the schedules on the days are indicated within a predetermined number of characters from the head of the schedule.

When the calendar key 165 is operated under the indication of the schedule shown in FIG. 5(*a*), the schedule on the day designated by the cursor is indicated in a graphic manner as shown in FIG. 5(*b*). That is, the times of beginning and ending the schedule are graphically indicated. The graphs of the time periods are indicated in a unit of one hour for example so as to inform the beginning and ending times of the schedule. There are indicated symbol marks such as "⊣", "⊢" or "-" at the head or end portion of the graph of the time period. This represents the schedule time from past nine to eleven with respect to the cursor position. That is, in the case of till eleven, the symbol mark "⊣" is indicated, and in the case of past eleven, the symbol mark "-" is indicated. Moreover, if the schedule begins from eleven, the symbol mark "⊢" is indicated and if the schedule begins from past eleven, the symbol mark "-" is indicated. This means that the input of the beginning time of the schedule is usually performed in a unit of one hour or half an hour. If the desired time of the schedule is inputted as on the hour in a unit of half an hour, the partition symbol marks "⊢" and "⊣" are respectively indicated as the on the hour times of beginning and ending the schedule. If the time of the schedule is inputted half an hour past from an on the hour time in a unit of half an hour, such a partition mark is not indicated as the times of the beginning and ending of the schedule.

Therefore, it can be easily judged from the graphic indication whether the schedule begins or ends at an on the hour time or half an hour past from an on the hour time in the case of inputting the schedule time in a unit of half an hour. However, the feature of the indication of the schedule time as shown in FIG. 5(*b*) is merely one example and another feature of the indication symbol of the time may be used if it is possible to judge easily by the indication symbol of the time whether the schedule begins or ends at the on the hour time or half an hour past from the on the hour time.

FIG. 5(*c*) shows another example of the display of the schedule.

In the above indication of the schedule time, although the explanation is made about the case of inputting the time in a unit of half an hour, the partition symbol marks mentioned above may be indicated for judging whether the beginning or ending time of the schedule is in a period of 0 to 29 minutes past or in a period of 30 to 59 minutes past from an on the hour time.

When a schedule is inputted, the date of the month and the day of the week must be inputted together with the year. However, there are some schedules of which the dates of the month are predetermined every year such as national holidays in each country, birthdays and marriage anniversaries of family and friends or acquaintances. The inputted of the dates mentioned above must be performed every year in the prior art but the schedules on the dates predetermined every year can be indicated by merely inputting the dates of the month. That is to say, the input of a second schedule having no designation of the year is made possible.

The input of the second schedule mentioned above is performed as follows. Upon operating the schedule key 164 while depressing the SHIFT key 111, the schedule input mode is set. In this set mode, the input of the year is not needed but, the date of the month and the day of the week, or, the month and the day of the week of the month, are inputted and the contents of the schedule such as national holidays, birthdays, marriage anniversaries and the day of FATHER and the day of MOTHER are inputted, whereby the schedules thereof are stored in the predetermined memory unit. The indication of the date of the schedule is distinguished by the inverted indication as shown in the indication portion "d" in the calendar indication display shown in FIG. 6(*a*). The contents of the schedule on the day is indicated as shown in FIG. 4(*b*) by shifting the cursor to the position of the day and operating the schedule key 164. In this case, the time of the schedule is not indicated as a matter of course.

CLOCK FUNCTION MODE

The clock mode and the world clock mode are respectively set by operating the clock key 162 and by operating the world clock key 163. The electronic clock comprises two functions, one is an indication function for indicating the country where the user of the electronic memorandum pad is present as a home region (specified region) and another is a function of a world clock for indicating times for various regions in the world.

In the case of setting the clock function mode, the present time being now counted by the clock unit is indicated as shown in FIG. 7(*a*) by operating the clock key 162. In FIG. 7(*a*), the indication portion i represents the time region under clock indication, the indication portion "j" represents the name of the country where the time region belongs, the indication portion "k" represents the date and the indication portion "l" represents the time.

Moreover, upon Operating the world clock key 163, the world clock function mode is selected and the world clock indication is performed as shown in FIG. 7(*b*). In this world clock indication, it is a large difference from the clock indication that a time difference for the region is indicated in the indication portion "m". The time difference indicated in the portion "m" represents the difference between the time for the home region (specified region) where the clock unit counts the time and the time for the indicated region as shown in FIG. 7(b). If "NEW YORK" in the United States is set as a home region, it is found that the time difference for "LONDON" in the United Kingdom is +5 hours. The plus mark (+) represents that the time in "LONDON" precedes than the time in the home region "NEW YORK".

Figure 8:
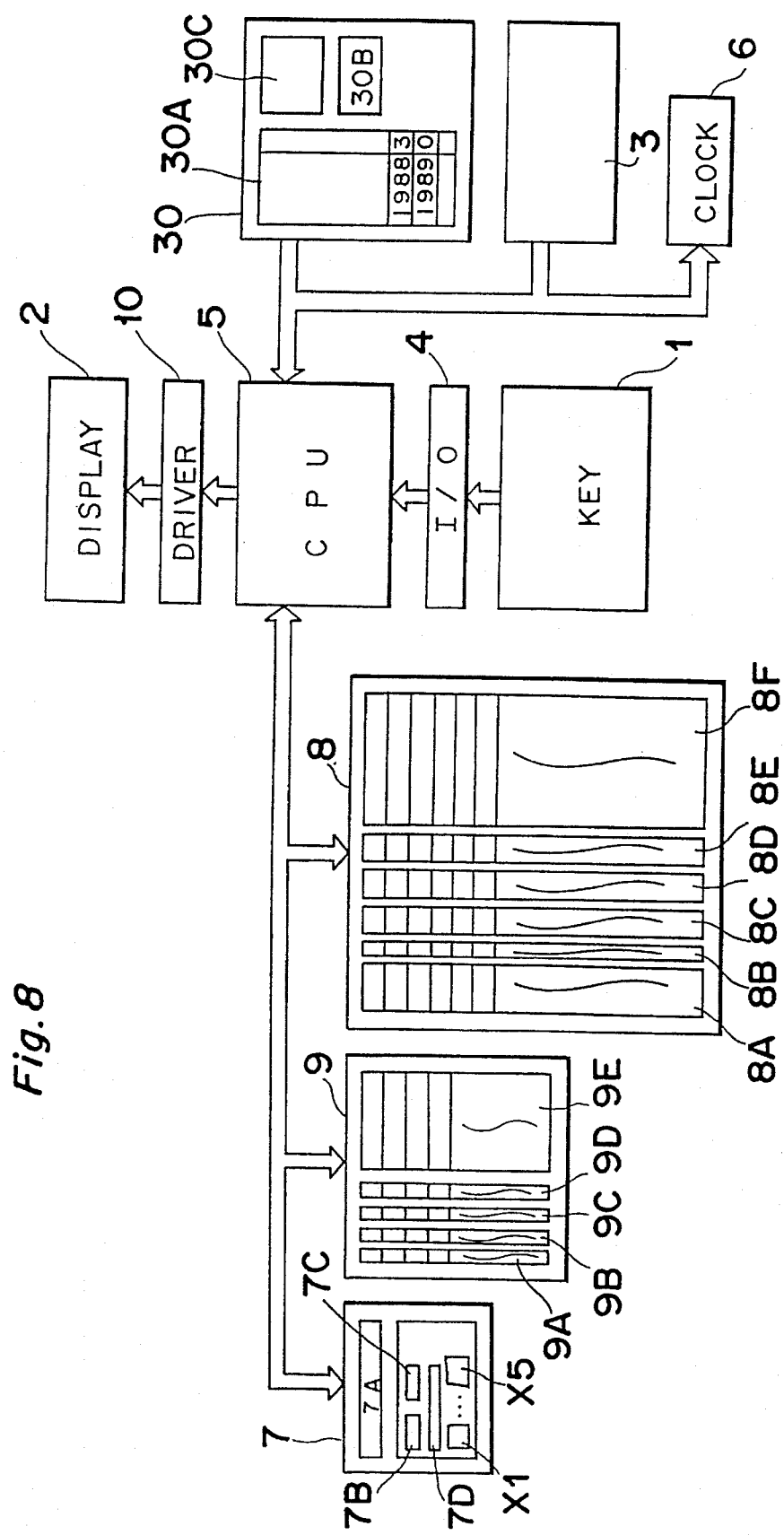
FIG. 8 is a block diagram showing a circuit arrangement for realizing respective functions of an electronic memorandum pad according to the present invention.

The electronic memorandum pad having the functions mentioned above is constituted by a circuitry arrangement as shown in FIG. 8. In FIG. 8, reference numeral 3 denotes a program ROM for storing a program for operating an electronic memorandum pad according to the present invention, and reference numeral 4 denotes an input/output unit (referred to as I/O below) for receiving a key input signal which is generated by operating a key input unit 1 and for sending the signal to a central processing unit (referred to as CPU hereinafter) 5. Necessary data are transmitted from CPU 5 to the display unit 2 of dot matrix LCD through a driving unit 10 so as to be indicated on the display screen depending on the instruction of CPU 5.

Moreover, reference numeral 30 denotes a calendar ROM for storing a calendar every year, and reference numeral 6 denotes a clock unit counting the present time in the home region. Reference numeral 7 denotes a register (RAM) for temporarily storing a necessary data when needed, reference numeral 8 denotes a schedule memory unit for storing an input schedule which can be read out, and reference numeral 9 denotes a second schedule memory unit for storing data such as a date and time of a schedule predetermined every year which can be read out. Not only a part of the register (RAM) 7 provided in the electronic memorandum pad but also a RAM of an integrated circuit card (referred to as IC card hereinafter) removably provided in the electronic memorandum pad may be available for the memory units 8 and 9 mentioned above. That is to say, in order to store telephone numbers and a timetable for trains instead of storing a schedule, the necessary data may be stored in the RAM of an IC card by exchanging IC cards each having a different function.

Next, the details of the respective memory units are explained as follows.

CALENDAR MEMORY ROM 30

In the calendar memory ROM 30, there is stored an A.D. year together with the day of the week corresponding to January 1 in the year in a memory area 30A for example. The day of the week mentioned above is stored in a manner of transforming the day into a numeric value. According to the feature of the present invention, the day Sunday to Saturday are assigned to "0" to "6" respectively. Therefore, since the day of January 1 in 1988 is assigned to "5" in the memory unit 30, it is judged by the CPU 5 that the day of the week on January 1 in 1988 is Friday so that a calendar for a month is indicated on the display unit 2 as shown in FIG. 6(a).

Moreover, in a memory area 30B in the calendar memory ROM 30, there is stored the number of the days in each month in a common year and that in a leap year and further stored the numbers of the days from January 1 to the first day of the month both in the common and leap years respectively. In other words, the number of the days from January 1 to February 1 in the common year is the same number as that in the leap year but the number of the days from January 1 to March 1 in the common year is different from that in the leap year. Therefore, the above mentioned numbers of the days are stored in the memory unit 30 differently in the common and the leap years respectively.

Figure 9:
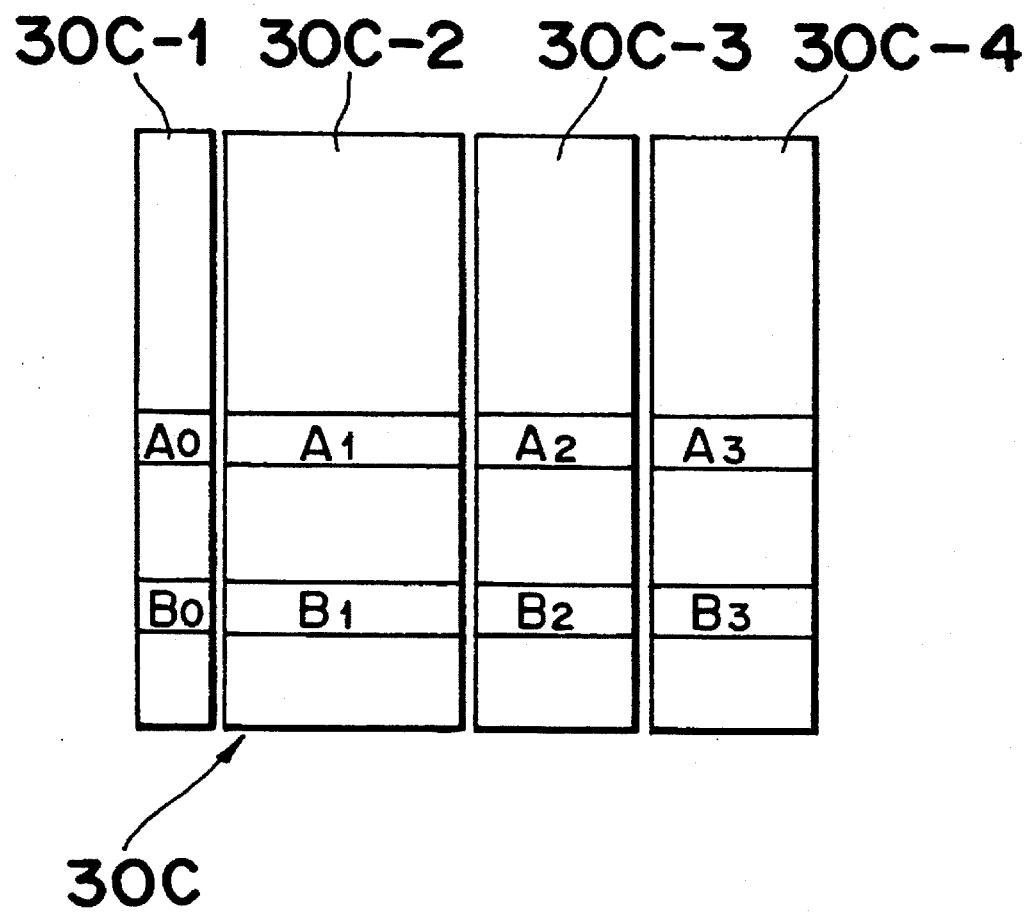
FIG. 9 is a partially enlarged diagram showing a part of a memory portion in detail in FIG. 8.

Moreover, a memory area 30C is defined in the ROM 30 in order to store a time region and the difference in time according to the world clock as shown in FIG. 9. Referring to FIG. 9, the memory area 30C comprises each address (30C-1), memory area (30C-2) for storing a time region corresponding to the address (30C-1), memory area (30C-3) for storing a name of a country where the time region is belonging and memory area (30C-4) for storing a time difference between the time in the time region and the time in the specified standard time region. Accordingly, upon designating one of the addresses, the time region corresponding to the address, the name of the country and the time difference stored in the respective memory areas corresponding to the address are read out.

SCHEDULE MEMORY UNIT 8

The schedule memory unit 8 is provided in the memorandum pad in order to store various data of a schedule to be inputted. The schedule memory unit 8 comprises a memory area 8A for storing the date (year, month and day) of the schedule, a memory area 8B for storing a data for informing whether or not an alarm signal is generated, a memory area 8C for storing the alarm time, a memory area 8D for storing the beginning time of the schedule, a memory area 8E for storing the ending time of the schedule, and a memory area 8F for storing the contents of the schedule.

For example, when the date counted by the clock unit 6 corresponds to one of dates stored in the memory area 8A in the schedule memory unit 8, the various data of the schedule stored in the corresponding area are read out.

SECOND SCHEDULE MEMORY UNIT 9

The second schedule memory unit 9, which is different from the above mentioned schedule memory unit 8, stores the data of the second schedule such as data of dates of national holidays, marriage anniversary and birthdays. The second schedule memory unit 9 comprises a memory area 9A for storing months, a memory area 9B for storing the day of the month, a memory area 9C for storing the day of the week, a memory area 9D for storing an ordinal of the week in a month and a memory area 9E for storing the contents of the schedule. For example, the second schedule memory unit 9 is used in order that, in a calendar indication, if a schedule in connection with the month is stored, the schedule is searched so as to indicate the day in connection with the schedule in inversion.

TEMPORARY MEMORY REGISTER

The temporary memory register 7 is provided in the electronic memorandum pad in order to store a necessary data such as a flag and other data as following under the control of the CPU 5. That is to say, a memory area 7A is defined in the register 7 in order to store the time counted by the clock unit 6 every counting operation and to store the date (year, month and day). A memory area 7B is used as a flag for selecting one of the indications of a calendar as shown in FIG. 6(a) or a calendar as shown in FIG. 6(b). A memory area 7C is used as a flag for setting a mode selecting whether the month and day are input as a second schedule inputted data or the month and the ordinal of the week in the month and the day of the week are input as a second schedule inputted data. Moreover, a memory area 7D is used for storing one of the addresses of various time regions in the world in the clock function mode. In other words, according to the address stored in the area 7D, the clock indication in the first time region is determined in the world clock function mode.

Moreover, the temporary memory register 7 comprises memory portions X1 to X5 for performing various calculations in the calendar function mode.

Next, the control operations of the block units shown in FIG. 8 will be explained in connection with the respective functions described above with reference to flow charts and displays in the respective functions.

CONTROL IN THE CALCULATION FUNCTION MODE

When the calculation key 161 is operated, the CPU 5 receives and responses to the key operation signal generated by operating the key 161, so that the calculation function mode is set to be perform various calculations. In the flow chart shown in FIG. 2, when the calculation function mode is set, the CPU 5 is operated in accordance with the flow chart shown in FIG. 10.

Figure 10:
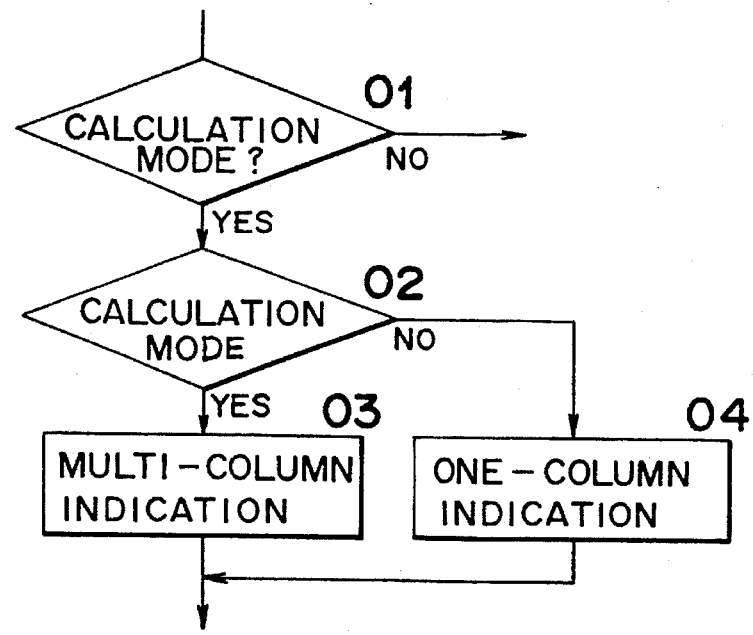
FIG. 10 is a flow chart showing a control in a calculation mode.

As shown in FIG. 10, after it is judged in step 01 whether the calculation key is operated or not, the input condition of the calculation key 161 is also judged in step 02 whether or not the calculation function mode is set. When the calculation key 161 is not operated once more in the computer function mode, i.e., when only one time operation of the key 161, the calculation indication in one column for performing a usual calculation is set in step 04, whereby the calculation indicated in one column is performed and the calculated result is indicated as shown in FIG. 3(a). On the other hand, when the calculation key 161 is continuously operated two times, the multi-calculation mode for indicating in a manner of doing sums on paper is set. In other words, the calculation estimate is formed in multi columns and the operants together with the numeric values are indicated so that the calculated result is indicated by operating the equal (=) key 112 as shown in FIG. 3(b).

CONTROL IN THE CALENDAR FUNCTION MODE

The calendar function mode is set by operating the calendar key 165. In the flow chart shown in FIG. 11(a), when the calendar mode is set in step U1, a calendar is indicated in the display unit 2 in accordance with the data of the date disclosed by the clock unit 6. That is to say, the date such as a year, month and day counted by the clock unit 6 is stored in the area 7A of the temporary memory register 7 and the contents of the data in the area 7A are read out. For example, when the data of the date of Jan. 11, 1988 A.D. is counted by the clock unit 6 so as to be stored in the memory area 7A in the register 7, the date of Jan. 11, 1988 A.D. is read out in step U2.

Subsequently, the day of the week on January 1 of the year stored in the memory area 30A in the calendar memory ROM 30 is read out in correspondence with the A.D. year of the data read out of the area 7A mentioned above. Based on the data of the day of the week on January 1 mentioned above, the days in January are respectively allocated to the days of the week so that a calendar is indicated as shown in FIG. 6(a). Since the above indicated calendar is January and the day of the week of January 1 of the year is stored in the memory area 30A, the calendar can be easily indicated by performing a calculation with reference to the day of the week mentioned above. While the calendars on and after February are indicated by performing a calculation as follows.

The read out data ("5") of a day of the week on January 1 in the year is written in the area X1 in the temporary memory register 7 in step U3. Subsequently, the number of the days from January 1 to the month of the calendar to be indicated (e.g., "0" in the case of January, "31" in the case of February and "60" in the case of March in the leap year) and the number of the days in each month are read out of the area 30B in the calendar memory ROM 30 and the data of the respective numbers of the days are written into the areas X2 and X3 in the register 7 in step U4. Subsequently in step U5, the data of the number of the days in the area X1 is added to that in the area X2 and the sum thereof is divided by 7 and the remainder data of the divided result is written in the area X4 in the register 7. In other words, the data stored in the area X4 represents the day of the week on the first day in the month, and if the data stored in the area X4 is "1" the day of the week on the first day is Monday.

The data of the day of the week on the first data in each month is calculated and when a calendar with Sundays arranged as the first days of the respective weeks is indicated, the number corresponding to the day of the week on the first day in the month is assigned and the number of the days stored in the area X3 is sequentially assigned in the order of the day of the week from the first day, thereby indicating a calendar as shown in FIG. 6(a) in step U6.

Moreover, according to the present invention, there are indicated not only a simple calendar but also the number of the days from January 1 to one day of the year designated by the cursor, the number of the days from the day designated by the cursor to the last day of the year and what ordinal of the week of the year is it the designated day as shown by indication portions "a", "b" and "c" respectively. The above mentioned indication is performed as follows.

Figure 11B:
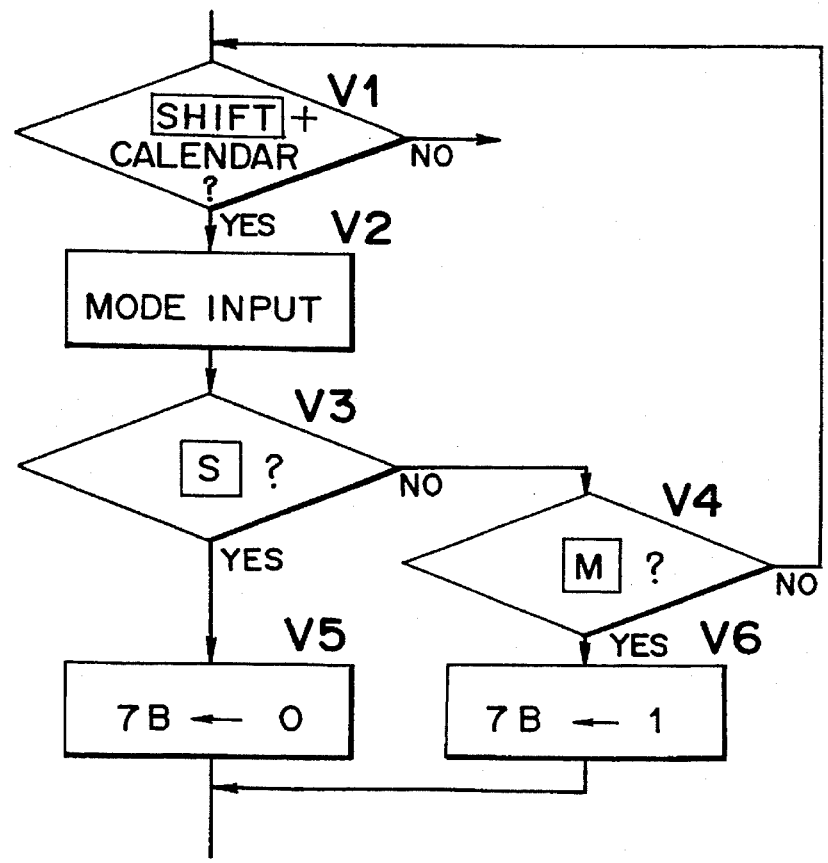
FIGS. 11(a) and 11(b) are flow charts showing controls of a calendar indication and of a schedule indication respectively.
Figure 11A:
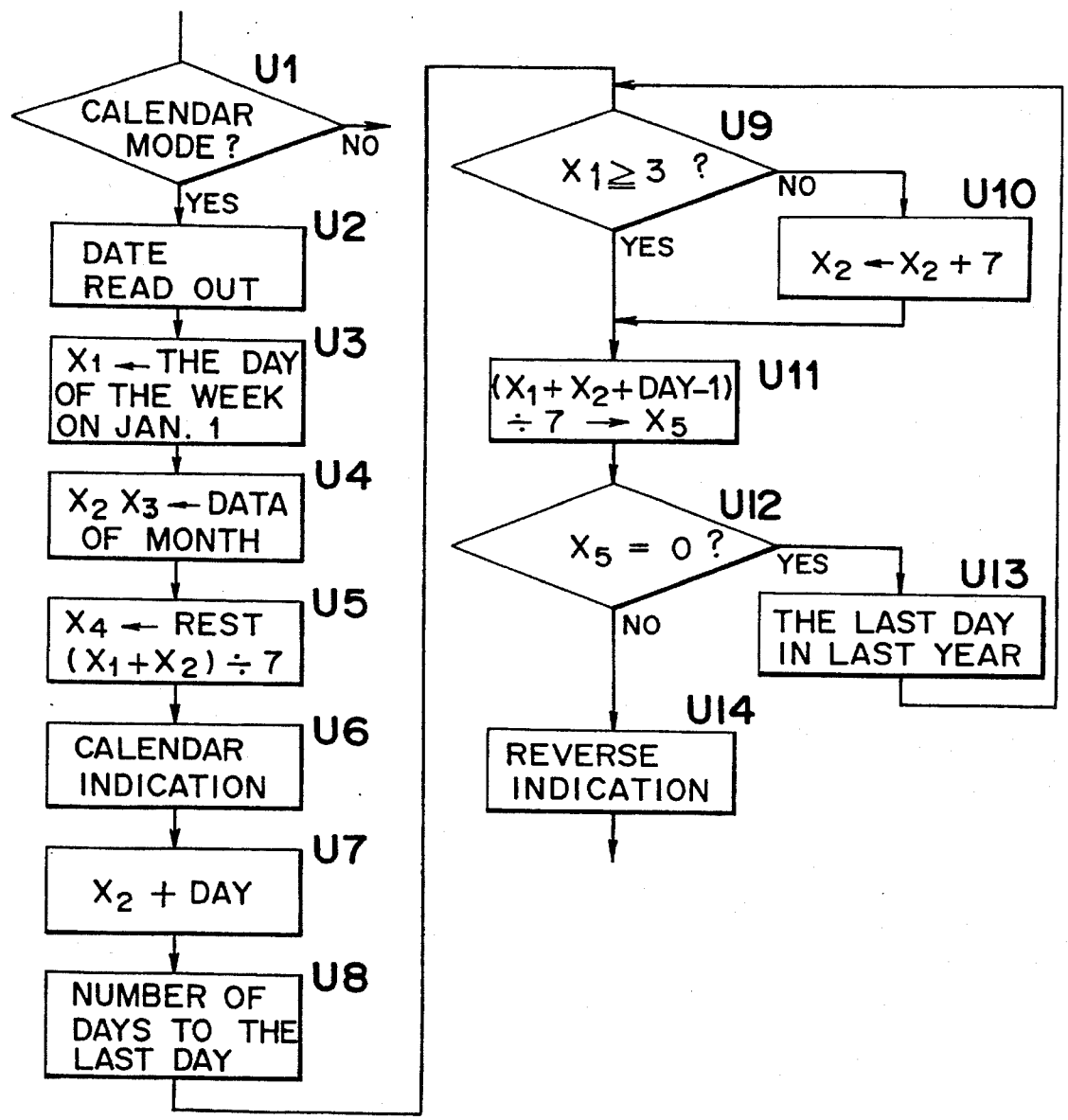

That is to say, as shown in FIG. 11(a), upon adding the number of the days stored in the area X2 to the day of the month designated by the cursor, the number of the days from January 1 to the designated day is indicated at the indication portion "a" in the display unit 2 in step U7. Subsequently, the above number of the days indicated at the portion "a" is subtracted from the number of the whole days in the year, whereby the number of the remaining days to the last day of the year is calculated and is indicated in the indication portion "b" in step U8.

As to the indication of the ordinal of the week at the indication portion "c", it is judged at step U9 whether or not the data stored in the area X1 is on and after Wednesday (i.e., whether the data in X1 is more than 3 or not), and in case the data in the area X1 is smaller than 3, i.e., before Wednesday, since the days from January 1 to the last day of the week are considered as a week, the number of the days stored in the area X2 is added to 7 and the added result is written in the area X2 in step U10. Subsequently, the data in the area X1 add the data in the area X2 and the day of the month are added together and further subtracted by 1, so that the calculated result is divided by 7, whereby the calculated result is stored in the area X5 in step U11 and the remainder thereof representing the day of the week is discarded. The contents of the area X5 are indicated in the portion "c" as shown in FIG. 6(a), which is reversely indicated in step U14.

However, when the day of the week on January 1 is on and after Wednesday (i.e., X1≧3) in step U9, the process of the control directly goes to step U11. Subsequently, in step U12, it is judged whether or not the data stored in the area X5 is 0, and unless the data in the area X5 is 0, the content of the area X5 is reversely indicated as shown in FIG. 6(a) in step U14. If the data in the area X5 is 0, the number of the days throughout the last year (366 days in the case of a leap year) is read out of the area 30B and is stored in the area X2 in step U13, subsequently the process returns to step U9 and the calculation mentioned above is repeated. In other words, the day of January 1 in 1988 is included in the last week in the last year 1987 and the indication representing the 52nd week in the year is indicated in the display portion "c" in the calendar indication mode.

In the calendar indication mode as shown in FIG. 6(a), the reason why the day of January 16 is reversely indicated is that the data of the day is a second schedule predetermined every year such as a birthday, marriage anniversary and national holidays. In this indication, when the cursor is shifted to be positioned at the day position and the schedule key 164 is operated, the contents of the schedule stored in the second schedule memory unit 9 are indicated. Subsequently, upon operating the cursor shift keys 13, the contents of the schedule stored in the schedule memory unit 8 are sequentially indicated.

In the calendar indication mode as described above, the operation of reading out the schedule will be described later in the explanation of the schedule function.

In the calendar indication mode, the indication shown in FIG. 6(a) is performed on the basis of the data stored in the area 7B in the temporary memory register 7. In the case of switching the indication shown in FIG. 6(a) to the indication shown in FIG. 6(b), the operation of the process is controlled in accordance with the flow chart shown in FIG. 11(b). That is, the above indication switching mode is set by operating the calendar key 165 while depressing the SHIFT key 111 in step V1. Subsequently, a S or M character key in the character input keys group is operated for setting Sundays or Mondays as the first days of the weeks in the month of the calendar respectively in step V2. Next in step V3 or V4, it is judged whether or not the S or M key is operated. If the S key is operated, a data of "0" is stored in the area 7B in the register 7 and when the M key is operated, a data of "1" is stored in the area 7B. It is judged depending on the data "0" or "1" stored in the area 7B whether the indication shown in FIG. 6(a) or the indication shown in FIG. 6(b) is selected.

Moreover, it is not limited to an indication of a calendar for indicating the days in a month as shown in FIG. 6(a) but a calendar for indicating the days in a week may be used.

INPUT OF THE SCHEDULE

In the case the electronic memorandum pad is used as a schedule memory device, the schedule input mode is selected by operating the schedule key 164. When the mode of the electronic memorandum pad is in a state except the calendar mode, upon operating the schedule key 164, the input display of the schedule corresponding to the data stored in the area 7A in the temporary memory register 7 is indicated, i.e., the schedule corresponding to the date (year, month and day) which is counted by the clock unit 6 is indicated in the display unit 2. At this time, if there is inputted a schedule on the date, the schedule is indicated as shown in FIG. 4(a) for example.

However, there is no schedule inputted, the contents of the display are only the date and the day of the week. Subsequently, input operations of such as date, times of starting and ending the schedule, alarm output selecting data and the contents of the schedule are performed, which are similar to those in the conventional electronic memorandum pad.

Figure 13:
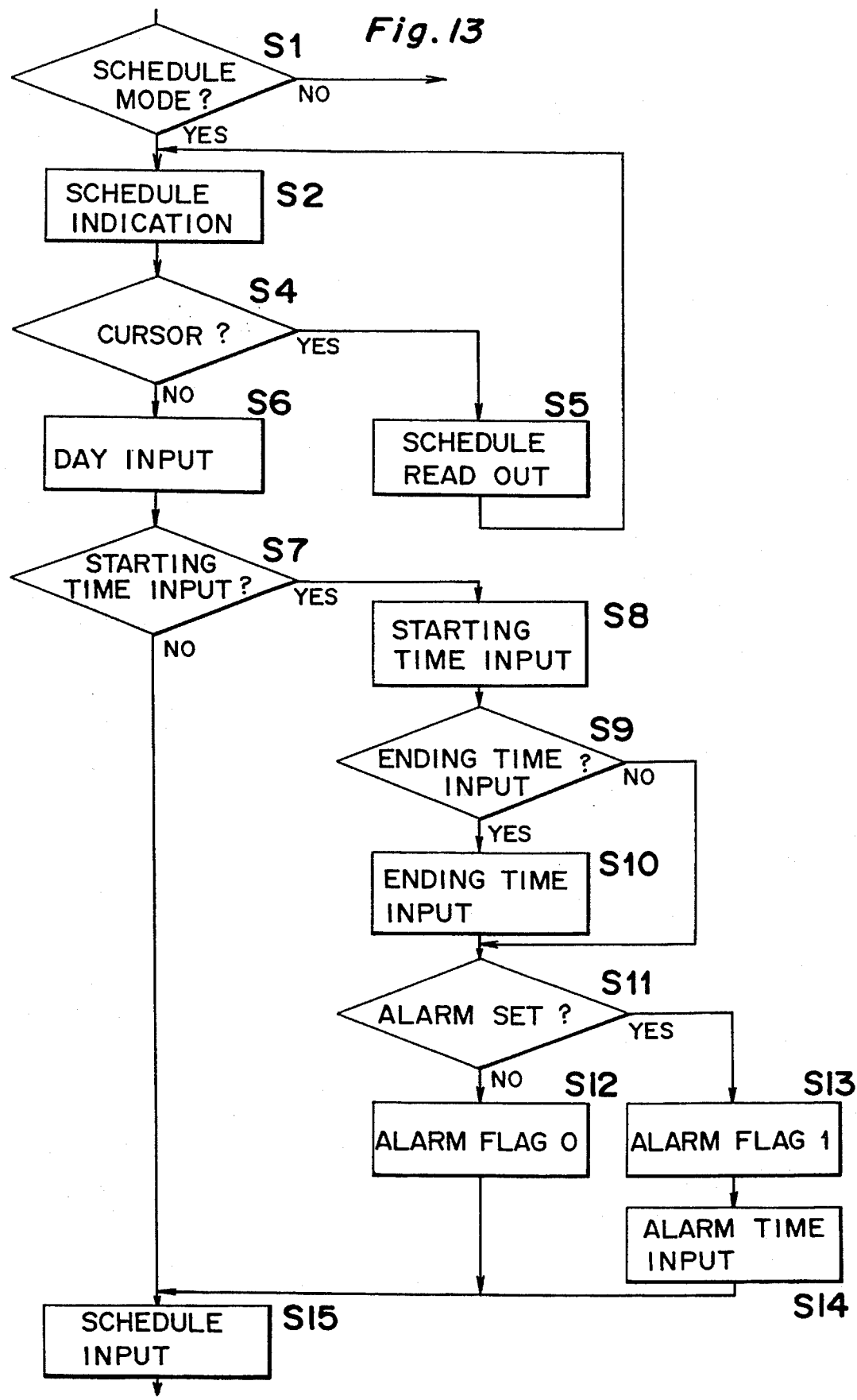
FIG. 13 is a flow chart showing a control of an input of a schedule.

The schedule input operation is described with reference to the flow chart shown in FIG. 13. If the schedule mode is selected in step S1, the contents of the schedule corresponding to the date as described above are indicated in step S2. Under the condition of indicating the contents of the schedule, when a numeral input key is operated instead of operating a cursor shift key 13 in step S4, the process goes to step S6 and an input of a day is performed so as to input the date (year, month and day) in this case. When the input operation is completed, the cursor is set in a state in which the time can be inputted, i.e., the cursor is moved to the time indication position in the display. Therefore, the necessary starting time of the schedule may be input in steps S7 and S8. If the inputted of the starting time is unnecessary, the input process of the contents of the schedule is performed in step S15, and subsequently, the date of the schedule is stored in the area 8A and the contents of the schedule are stored in the area 8F in the schedule memory unit 8 by operating the ENTER key 121.

On the other hand, in the case of entering the starting time of the schedule, the numeric value of the starting time is entered in step S8 and it is judged in step S9 whether or not the ending time of the schedule is entered. After the process for entering the ending time in step S10, it is judged in step S11 whether or not the alarm operation is needed to be set. The alarm setting operation is performed by operating the equal (=) key 112 under depressing the SHIFT key 111, i.e., the alarm flag is set to 1 in step S13. If the alarm setting operation is not needed in step S11, the flag of the alarm is set to 0 in step S12. That is to say, the flag "0" representing the state without an alarm is stored in the area 8B in the schedule memory unit 8. If the alarm operation is needed, the flag is changed from "0" to "1" and the alarm time is inputted in step S14. When the input of the alarm time is completed, the process for entering the contents of the schedule is performed in in step S15 as described above. Upon operating the ENTER key, the data of the date of the schedule are stored in the respective areas of the schedule memory RAM 8, the starting time is stored in the area 8C, the ending time in the area 8D, and if the alarm is set, the alarm time is stored in the area 8E and further the contents of the schedule are stored in the area 8F.

If the alarm flag is set to "1", the alarm output operation is performed under the control of the CPU 5 when the time counted by the clock unit 6 alarm time. This means that the alarm signal is generated when the time counted by the clock unit 6 is coincident with the alarm flag "1".

INPUT OF THE SECOND SCHEDULE

Figure 14:
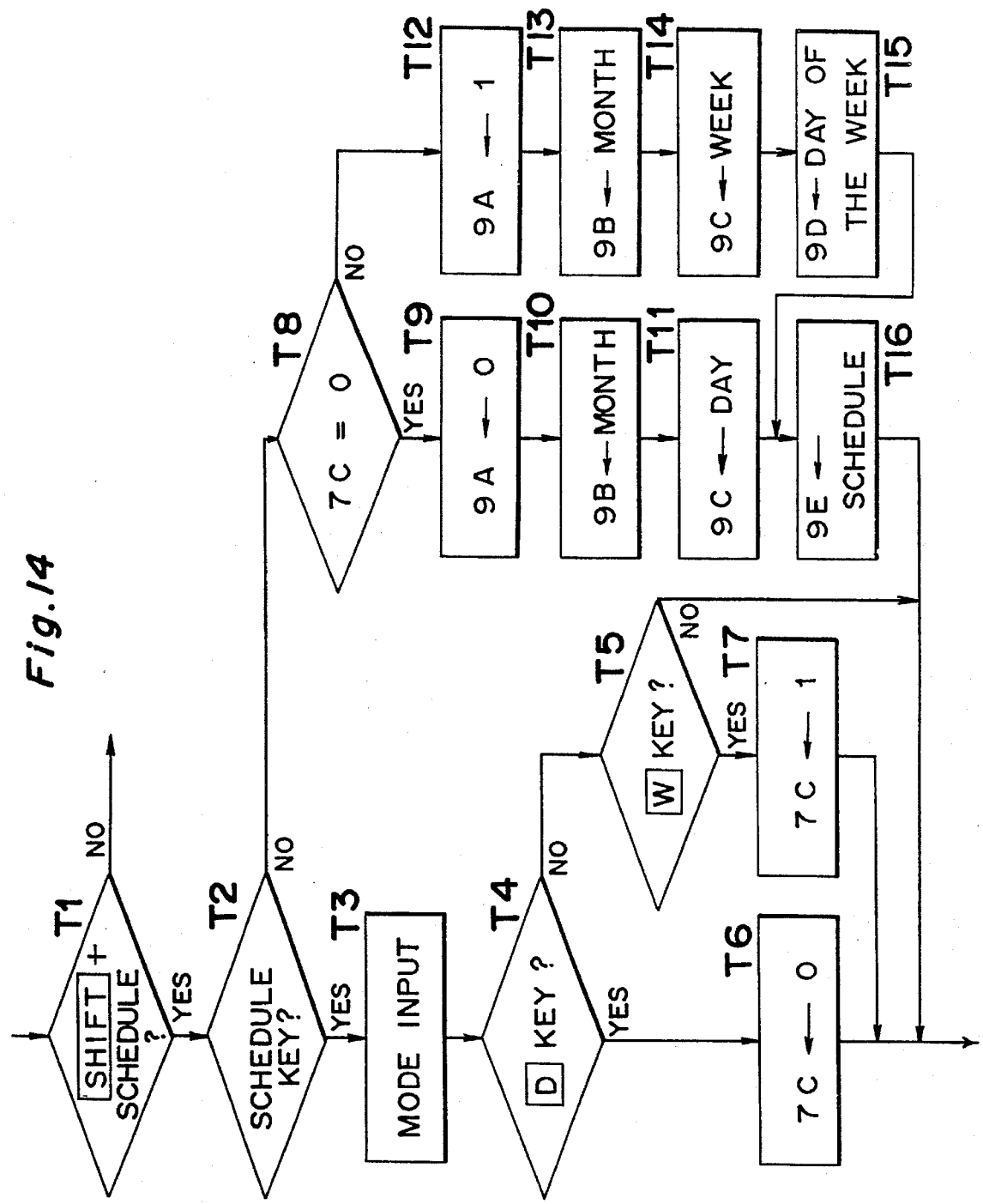
FIG. 14 is a flow chart showing a control of an input of a second schedule.

When various schedules are entered, it is effective to enter such schedules of which the dates are predetermined every year. Therefore, the second schedule input mode is set by operating the schedule key 164 while depressing the SHIFT key 111. In FIG. 14, the input operation of the specified day such as a birthday, national holidays and marriage anniversary and the input operation of the specified days of the week specified in the month such as MOTHER Day or FATHER Day are shown and the switching mode between the two kinds of input operations mentioned above is shown.

When the second schedule mode is selected in step T1 by operating the schedule key 164 under depressing the SHIFT key 111, the operation of the schedule key 164 is judged in step T2 and if the schedule key 164 is operated, the process becomes the input process in step T3. Subsequently, it is selected by operating a character D or W key in the character input keys 12 whether a day or a week is designated in step T4 or T5. When the D key is operated, the date input mode is set and the mode such as "0" is stored in the area 7C in the temporary memory register 7 in step T6. When the W key is operated, the week input mode such as "1" is stored in the area 7C in the temporary memory register 7 in step T7. When the schedule data is inputted by designating the mode, if the schedule key is not operated in step T2, the process goes to step T8 and it is judged whether or not the content of the area 7C of the temporary memory register 7 is "0", whereby it is decided whether the date input mode or the week input mode is set. If the content of the area 7C is "0", i.e., when the date input mode is set, a data "0" representing the date input mode is stored in the area 9A in the second schedule memory unit 9 in step T9, a data of an input month is stored in the area 9B in step T10, a data of an input day is stored in the area 9C in step T11 and the contents of the second schedule on the day are stored in the area 9E in step T16 respectively by operating the ENTER key 121.

If the week input mode is selected in step T8, the process goes to step T12 and a data "1" is stored in the area 9A, a data of the input month is stored in the area 9B in step T13, a data of the week ordinal of the month is stored in the area 9C in step T14 and a data of the day of the week is stored in the area 9D in step T15 and further the contents of the schedule are stored in the area 9E in step T16 respectively by operating the ENTER key 121.

OUTPUT OF THE SCHEDULE

When the schedule key 164 is operated in the calendar, the data of the schedule on the day designated by the cursor position in the calendar indication is primarily indicated.

That is to say, the contents of the schedule corresponding to the day designated by the cursor in the calendar indication are read out of the schedule memory unit 8. For example, in the indication as shown in FIG. 6(a), the contents of the schedule on January 11 in 1988, especially the starting time of the schedule on that day is read out of the area 8C, the ending time thereof is read out of the area 8D and the contents of the schedule are read out of the area 8E respectively in the schedule memory unit 8 and the read out data of the schedule are indicated as shown in FIG. 4(a). In this indication, when any one of the cursor shift keys 13 (especially the cursor shift up or down key 132 or 134) is operated, a schedule just before or after the present indication of the schedule is indicated. The above indication of the schedule just one before the present indication means the indication of the last one of the schedules stored yesterday and the indication of the schedule just one after the present indication means that, if there is a schedule on that day, the contents of the schedule stored in the next time are read out, and that, if there is no schedule, the contents of the schedule to be stored next are read out to be indicated.

In the calendar indication mode as shown in FIG. 6(a), if the day reversely indicated is designated by the cursor, the contents of the second schedule are indicated with priority. That is, when the schedule key 164 is operated, the data of the second schedule corresponding to the designated day are respectively read out of the areas of the second schedule memory unit 9 so as to be indicated as shown in FIG. 4(a). Moreover, upon operating any one of the cursor shift keys 13, the contents of the schedule just before or after the present indication of the schedule are read out as described above. At this time, if there is no content of the second schedule stored, the date thereof is searched among the data in the schedule memory unit 8 and when there is stored a schedule in the memory unit 8, the contents of the schedule are indicated.

As described above, upon operating the schedule key 164 in the calendar indication mode, the contents of the schedule or the second schedule are read out of the schedule memory unit 8 or of the second schedule memory unit 9 so as to be indicated. Under the indication mentioned above, new schedule data can be inputted to be stored.

Figure 12:
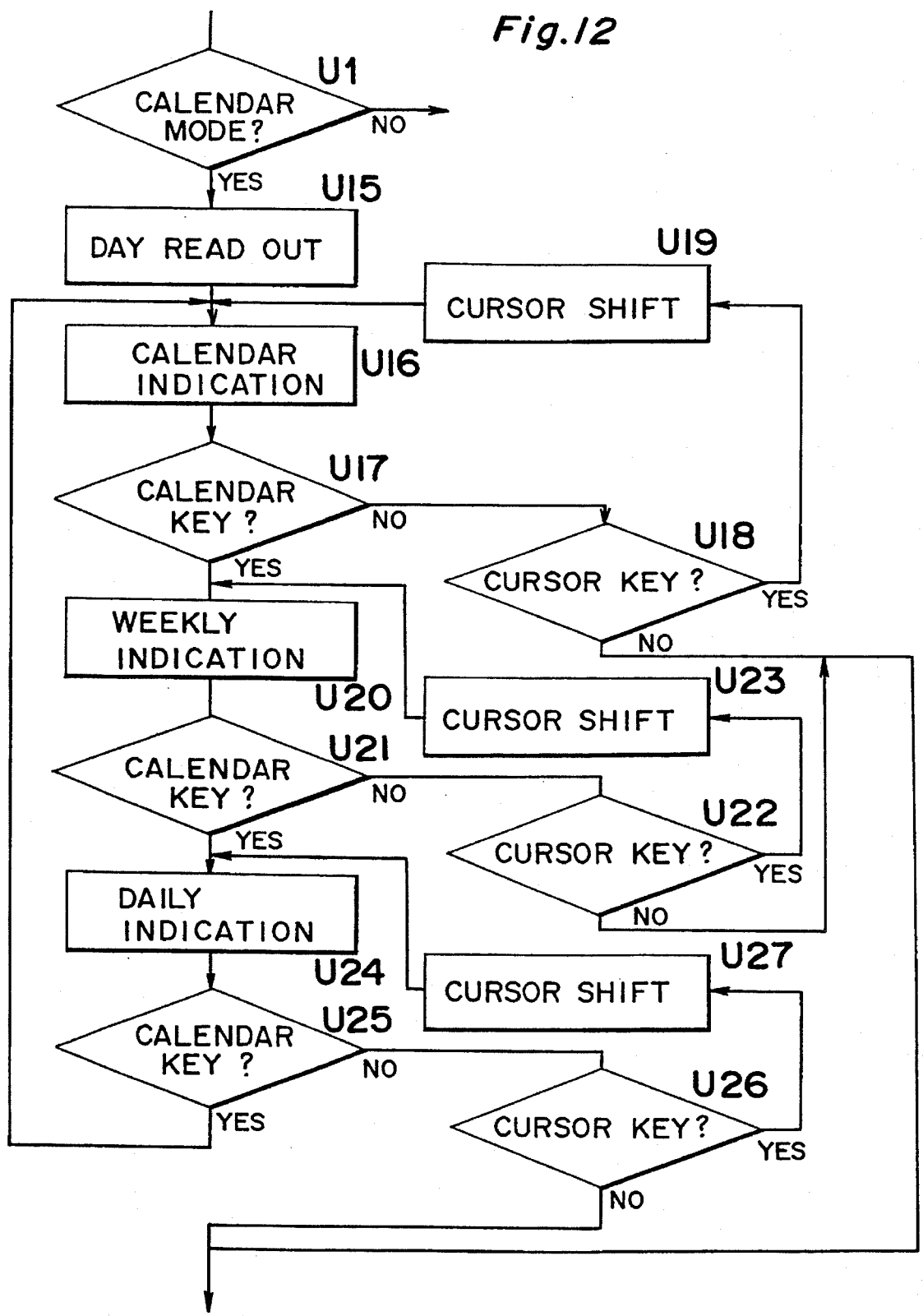
FIG. 12 is a flow chart showing a control for indicating a schedule in a calendar mode.

Next, in the calendar indication mode, upon operating the calendar key 165, the contents of the schedule can be read out to be indicated. With reference to the flow chart shown in FIG. 12, if the calendar function mode is selected in step U1, the day is called out in step U15 and the calendar corresponding to the day is indicated in step U16. Next in step U17, it is judged whether or not the calendar key 165 is operated. If the calendar key 165 is not operated in step U17, the process goes to step U18 and it is judged whether or not any one of the cursor shift keys 13 is operated, and if any one or more of the cursor shift keys 131 to 134 is appropriately operated, the cursor is shifted in step U19 and the day designated by the cursor is changed. If the cursor position is shifted beyond the day of the month in the present indication by operating the cursor shift key 132, the first day of the next month (e.g., February) is designated and the calendar of the month is indicated in accordance with the flow chart shown in FIG. 11(a).

If the cursor key is not operated in step U18, the indication of the calendar is kept. If the mode setting operation is not being performed for a predetermined time, the calculation function mode may be automatically set with priority for example. Moreover, if the electronic memorandum pad is not used for a predetermined period after turning on the power source, the power source may be automatically switched off.

In the calendar indication mode, if the calendar key is operated in step U17, the data of the weekly schedule are indicated in step U20. The week mentioned above is determined by the system program to be a week from the present day or a week from Sunday to Saturday including the present day, which has no direct relation to the present invention. In the indication of the weekly data, the contents of the respective schedules corresponding to the respective days of the week are indicated as shown in FIG. 5(a). In this indication, the number of the characters on one line in the display unit 2 is predetermined and the contents of the schedule are respectively indicated with a predetermined characters from the head. In this indication, the day indicated by the cursor is intended to be changed, any day can be designated freely by shifting the cursor shift key in steps U22 and U23.

Subsequently, under the condition of indicating the contents of the weekly schedules as shown in FIG. 5(a), the calendar key 165 is operated once more in step U21, whereby the daily data of the schedule on the day designated by the cursor is indicated in step U24 as shown in FIG. 5(b). Under the condition of indicating the daily data as mentioned above, when the calendar key 165 is operated again, the indication is changed into a calendar indication mode as shown in FIG. 6(a). In this indication mode, the data of the schedule cannot be entered. Moreover, the indication portion "n" as shown in FIG. 5(b) represents that there are existing data of schedule after a schedule "DINN". Therefore, when the data of the schedule after the schedule "DINN" is designated by shifting the cursor shift keys 13, the weekly schedule data after the schedule "DINN" are indicated.

As to the indication of a schedule in the calendar function mode, the day of the month corresponding to the schedule stored in the schedule memory unit 8 or 9 is searched among the days of the month stored in the memory unit and if there is stored a schedule corresponding to the day of the month, the data of the schedule are indicated in the calendar function mode. In the indication of the calendar function mode, as to the indication of the schedule on the reversely indicated day, the contents of the schedule stored in the schedule memory unit 9 are primarily read out.

INDICATION OF THE SCHEDULE TIME

When a daily schedule is indicated as shown in FIG. 5(b), the schedule times are indicated in a graphic manner, indicating the times in a horizontal axis in a unit of an hour. The indication of the daily schedule is performed in accordance with the data of the input times and the time indication thereof is described as following with reference to the flow chart shown in FIG. 15.

In the indication shown in FIG. 5(b), it is represented that the starting and ending times of the second schedule "STAF" are respectively 9:30 and 11:00. That is, the starting and ending times of the schedule of "STAF" are entered to be stored in the areas 8C and 8D respectively in the schedule memory unit 8 and the graphic indications of the schedule times are performed on the basis of the data of the times stored in the areas 8C and 8D.

Figure 15:
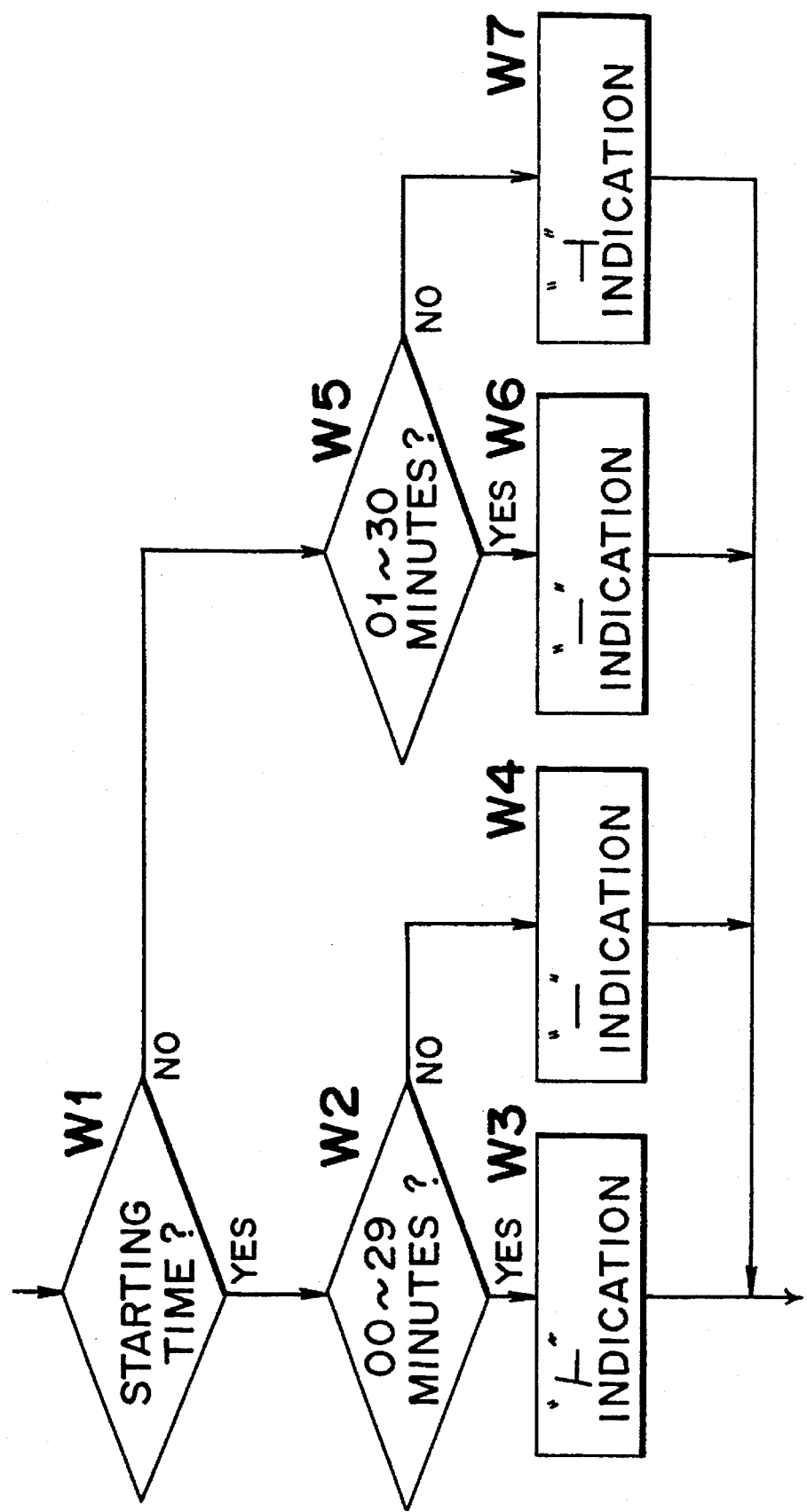
FIG. 15 is a flow chart showing a control for indicating a time in a graphic representation in a schedule indication.

As shown in FIG. 15, it is judged in step W1 whether or not the indication time is the starting time of the schedule, and if the starting time is indicated, the process goes to step W2 and it is judged whether or not the minute portion of the starting time is within the range of the time from 00 to 29 minutes. If the starting time is 9:30, since the data of the minutes of the time exceeds the range from 00 to 29, the head position of the graph of the starting time corresponding to 9:00 is indicated to be "-" in step W4. Since the ending time of the schedule is just 11:00, the end position of the graph of the ending time corresponding to eleven is indicated to be "⊣" in steps W5 and W7.

By performing the time indication as described above, it can be clearly judged whether the schedule starts at 9:00 or 9:30 and whether the schedule ends at just 11:00 or 11:30. If the input of the schedule time is counted in a unit of half an hour, it can be easily judged whether the starting or ending time of the schedule is on the hour time or half past the time, so that the time of the schedule can be precisely obtained without a large display frame. Moreover, each of the above mentioned symbols of the head and end portions of the graph of the starting and ending times is one example and other symbols may be used if the symbols are differently indicated between the on the hour time and half past the on the hour time. Moreover, by setting a lot of symbols, the times of the schedule can be more precisely indicated in a graphic manner. However, if the number of the symbols to be used is increased too much, it becomes difficult to judge the times corresponding to the symbols. Therefore, it may be desirable that the symbols are used for indicating the starting and ending times counted in a unit of the quarters.

CONTROL OF THE CLOCK FUNCTION MODE

The clock mode is set by operating the clock key 162 and the contents of the count counted by the clock unit 6 indicating the time in the home time region are displayed in the display unit 2 as shown in FIG. 7(a). When the world clock key 163 is operated, the address of the time region stored in the area 7D of the temporary memory register 7 and the present time thereof are indicated as shown in FIG. 7(b). That is to say, if an address B0 of a region as shown in FIG. 9 is stored in the memory area 7D, the present time in the time region assigned by the address B0 is primarily indicated. If the data of the address B0 is e.g. "LONDON", the present time in "LONDON" can be indicated by calculating the time difference (the data in the area B3) between the present time in the home time region which is counted by the clock unit 6 and the time in the reference time region. Since such a calculation as mentioned above can be performed in a manner similar to that in the conventional world clock, the explanation thereof is omitted.

Upon operating a search key 141 or 142 in the indication of the world clock time, in the case the time region assigned by e.g. the address B0 in the memory portion 30C shown in FIG. 9 is indicated, the region assigned by the upper or lower adjacent address is read out to be indicated. Subsequently, the address of the indicated region is rewritten in the memory area 7D in the temporary memory register 7. Accordingly, when the world clock key 163 is operated next, the region assigned by the address stored in the memory area 7D is primarily read out, so that the present time in the time region is indicated by the calculation between the time counted by the clock unit 6 and the time difference mentioned above.

In the indication as shown in FIG. 7(b), not only the time region but also the name of the country to which the time region belongs are indicated at the same time. This indication is performed in the manner that, the time region and the name of the country are respectively stored in correspondence with each other in the portions 30C-2 and 30C-3 in the memory area 30C of the calendar memory unit 30 as shown in FIG. 9 and that the data stored in the memory portions 30C-2 and 30C-3 are read out, thereby indicating the region and the name of the country. Therefore, it is confirmed that the times in the various time regions in the same country are different and the time in the desired time region can be easily obtained. Moreover, since the name of the country of the searched time region can be obtained, it can be generally confirmed where the region is located in the country.

In this indication as shown in FIG. 7(b), not only the time in any one of various time regions in the world is indicated but also the time difference between the time in the indicated time region and the time in the home time region is indicated in the portion m. As to the indication of the time difference mentioned above, if the home time region is "NEW YORK" for example, the time difference between the home time region and the reference time region is stored in the memory portion A3 of the memory portion 30C-4 corresponding to the address A0 and there is stored e.g. 12:00 as the time difference. Moreover, in the world clock mode, the time region of "LONDON" is searched and is stored in the address B0 in the memory area 30C, the data of the time difference such as "17:00" in the reference time region is stored in the area B3 of the memory portion 30C-4. Accordingly, the time difference between the time in the home "NEW YORK" and the time in the searched time region "LONDON" is calculated to be five hours (17:00−12:00=+05:00) so as to be indicated on the portion "m" in the display unit 2.

As described above, since the time difference between the specified time region and the searched and designated time region is indicated, the time in the specified time region can be easily confirmed with reference to the time difference.

The time difference mentioned above is not an indication of the time difference in the reference time region and there is no need to once reform the time into the reference time and to calculate the time difference between the specified time region and the reference time region, therefore, the time in the specified time region can be easily obtained.

CORRECTION OF THE TIME

Figure 16:
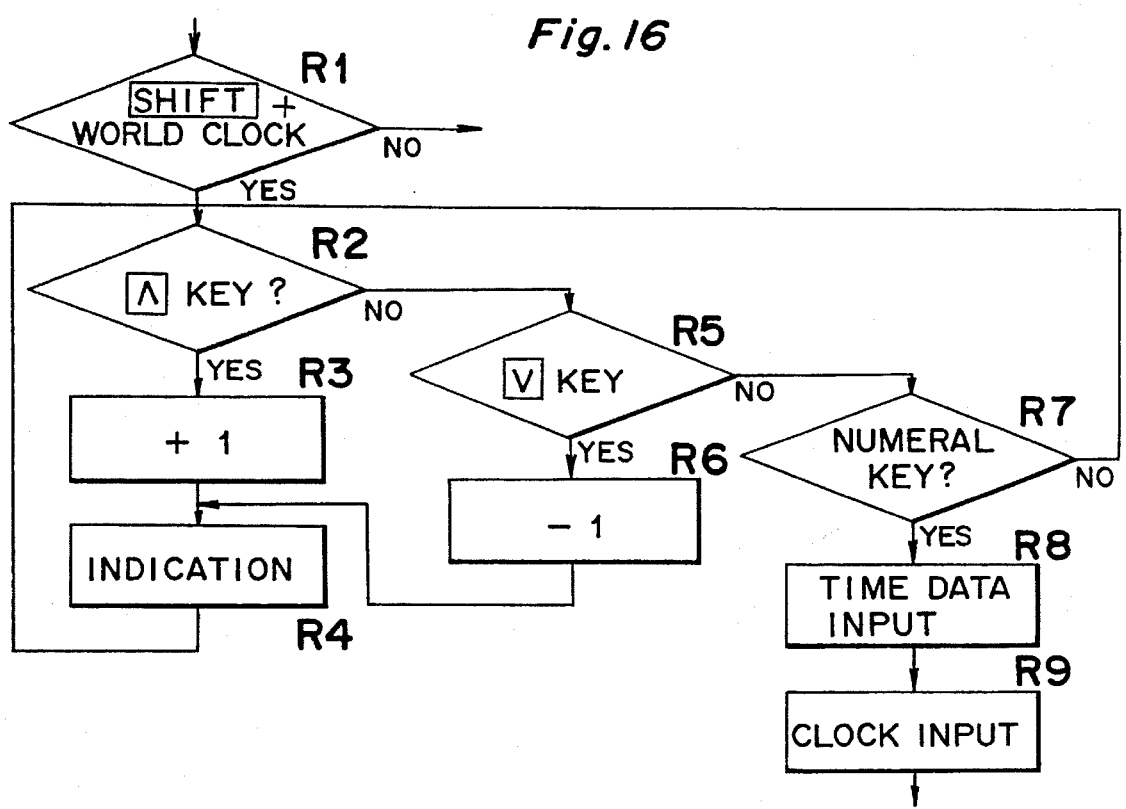
FIG. 16 is a flow chart showing a control in a time correction mode.

The correction of the time is performed by operating the world clock key 163 while depressing the SHIFT key 111 and the operation of the time correction is described with reference to the flow chart shown in FIG. 16.

The time correction mode is set in step R1 and the time in the region assigned by the address stored in the memory area 7D in the memory register 7 is indicated in step R4. If the time region is a desired time region, the data of the time is entered by operating the numeral keys without operating the search key 141 or 142. If the time region is not a desired one, the predetermined time regions are sequentially searched by operating the search key 141 or 142 and the times of the respective time regions are indicated in steps R2, R3 or R4, R6. When the desired time region is searched, the numeric value of the time data is entered and when the input operation of the numeric data of the time is completed, the contents of the clock unit 6 is rewritten into the corrected time input data by operating the ENTER key 121, whereby the time count operation of the clock unit 6 is started again in accordance with the corrected time.

The address of the time region having the time correction performed is stored in the area 7D in the memory register 7 and the time region is primarily read out by operating the world clock key 163.

CHANGE OF THE HOME TIME REGION

Figure 17:
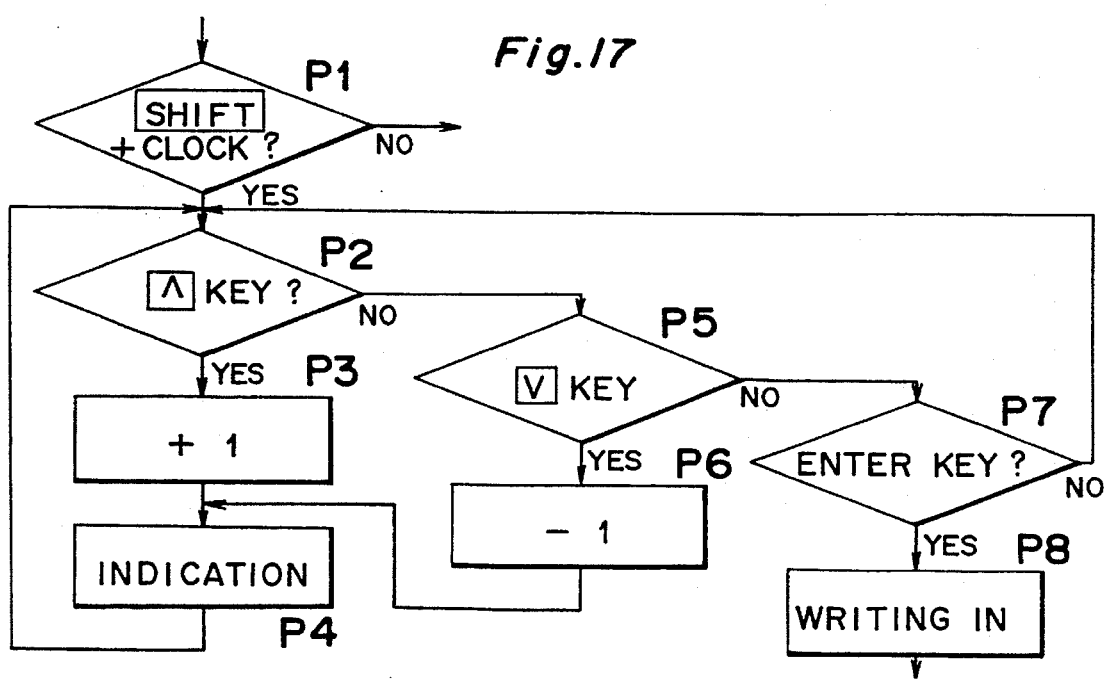
FIG. 17 is a flow chart showing a control in a correction mode for correcting a home region.

Next the operation of changing the home time region is explained with reference to the flow chart shown in FIG. 17. The home time region correction mode is set by operating the clock key 162 while depressing the SHIFT key 111 in step P1. At this time, the previous home time region is indicated as shown in FIG. 7(*a*). Then the desired time region is searched by operating the search key 141 or 142 in steps P2, P3 or P5, P6. When the desired time region is searched, the ENTER key is operated in step P7, whereby the time in the time region being indicated is rewritten as the counting time of the clock unit 6 in order to count the time in the changed home time region so that the operation for changing the home time region is finished.

After the completion of the operation as described above, the time counted by the clock unit 6 is indicated as the time in the home time region by operating the clock key 162 as shown in FIG. 7(*a*).

Moreover, since the time difference between the two different time regions is indicated, the time in one of the two time regions can be easily obtained with reference to the indicated time difference, resulting in that it becomes unnecessary to search one of the two time regions.

As mentioned above, according to the present embodiment of the electronic calendar, it can be displayed that how many days will pass or have passed to the specified date from the first day of the year, how many days are left from the specified date to the last day of the year, and/or how many weeks will pass or have passed to the specified date from the first week of the year, it is easily to know the above data at one glance to the display unit without any count of dates by displaying the calendar of respective months.

It is further advantageous that the number of dates included in a period between one day and another day can be calculated not only in case the one day and another day is contained in the same year but also the one day and another day are contained in the next year by adding the number of left days in one year with the number of days between the first day of the next contained in the next year to another day.

It is further advantage of the electronic device according to the present invention that the schedule times can be displayed with specific marks depending on whether the schedule is started or ended at an on the hour time such as 10:00 or 11:00 or the schedule is started or ended after an on the hour time such as 10:30 or 11:30, the judgment of what time the schedule is started or ended can be easily made.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A schedule control device comprising:

input means for inputting first data representing start times of a scheduled event and for inputting second data representing end times of a scheduled event;

control means, operatively connected to said input means, for processing said first and second data so that said first and second data are stored in a predetermined scheduled format; and display means, operatively connected to said control means, for displaying said first and second data of a stored scheduled event with graphic marks showing the start time and the end time thereof, a first type of graphic mark being a symbol which is geometrically shaped differently from a second type of graphic mark, said first and second types of graphic marks conventionally not conveying a numeric value and respectively conveying different first and second predetermined ranges of minutes correlated to said start and end times.

2. A schedule control device comprising:

input means for inputting scheduling information;

storing means, operatively connected to said input means, for storing one or more scheduled events and beginning and ending times for each scheduled event;

display means for displaying stored scheduled events in a graphic format;

discriminating means for determining to which, of a plurality of predetermined minute ranges, said beginning time and said ending time of a stored scheduled event correspond; and display control means, operatively connected to said discriminating means, for controlling said display means to display certain shaped graphic symbols when displaying a stored scheduled event, each graphic symbol conventionally not conveying a numeric value, a first type of graphic symbol being geometrically different from a second type of graphic symbol, said first and second types of graphic symbols respectively conveying different first and second predetermined minute ranges corresponding to said beginning time and said ending time of a scheduled event.

3. The schedule control device as claimed in claim 2, wherein said first and second predetermined minute ranges are two ranges, one range being of 0 to 29 minutes and another range being of 30 to 59 minutes.

4. A schedule control device comprising:

input means for inputting scheduling information;

storing means, operatively connected to said input means, for storing one or more scheduled events and a beginning time and an ending time for each scheduled event;

display means for graphically displaying each stored scheduled event in a manner such that one scheduled event is not co-linearly displayed with another scheduled event;

discriminating means for determining to which, of a plurality of predetermined minute ranges, said beginning time and said ending time of a stored scheduled event correspond; and display control means, operatively connected to said discriminating means, for controlling said display means to display certain distinctly shaped graphic symbols when displaying a stored schedule, each graphic symbol being a distinctly shaped symbol which non-conventionally conveys a chronological value, wherein a first type of said distinctly shaped graphic symbols conveys a first predetermined minute range and a second type of said distinctly shaped graphic symbols conveys a second predetermined minute range corresponding to said beginning and ending times, said first and second predetermined ranges being different.

5. The schedule control device as claimed in claim 4, wherein said first and second predetermined minute ranges respectively comprise a range of 0 to 29 minutes and a range of 30 to 59 minutes.

* * * * *